W. G. AND E. M. WEATHERLY.
ANTISKIDDING DEVICE.
APPLICATION FILED JUNE 25, 1919.

1,316,008.

Patented Sept. 16, 1919.

INVENTORS:
William G. Weatherly & Edward M. Weatherly
BY
ATTORNEY.

UNITED STATES PATENT OFFICE.

WILLIAM G. WEATHERLY AND EDWARD M. WEATHERLY, OF APPLEBY, TEXAS.

ANTISKIDDING DEVICE.

1,316,008.   Specification of Letters Patent.   Patented Sept. 16, 1919.

Application filed June 25, 1919. Serial No. 306,632.

*To all whom it may concern:*

Be it known that we, WILLIAM G. WEATHERLY and EDWARD M. WEATHERLY, citizens of the United States of America, and residents of Appleby, in the county of Nacogdoches and State of Texas, have invented certain new and useful Improvements in Antiskidding Devices, of which the following is a specification.

This invention relates to anti-skidding devices for traction wheels and has for its object the provision of novel means for preventing sidewise or circumferential skidding or movement of a tire. In other words, the said device will prevent side skidding or circumferential spinning of the wheel and insure against loss of power, due to insufficient traction.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
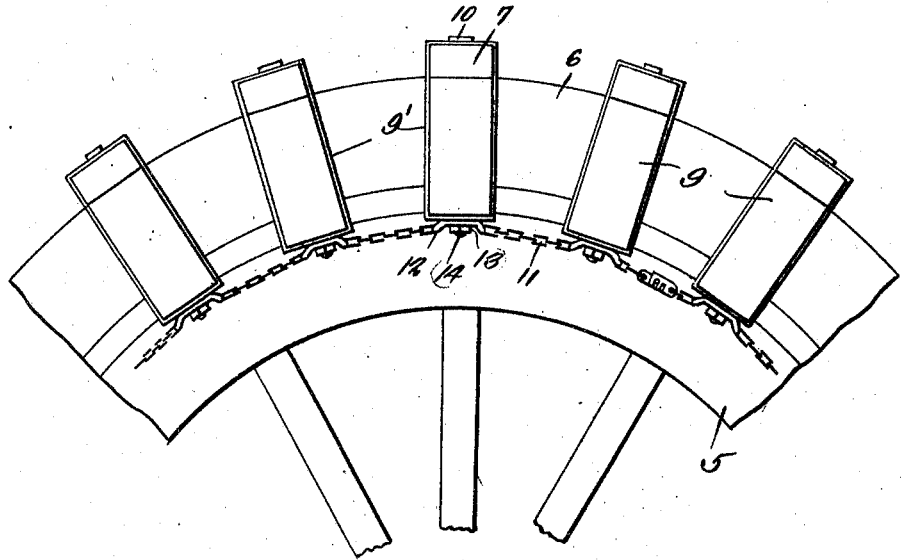
Figure 2:
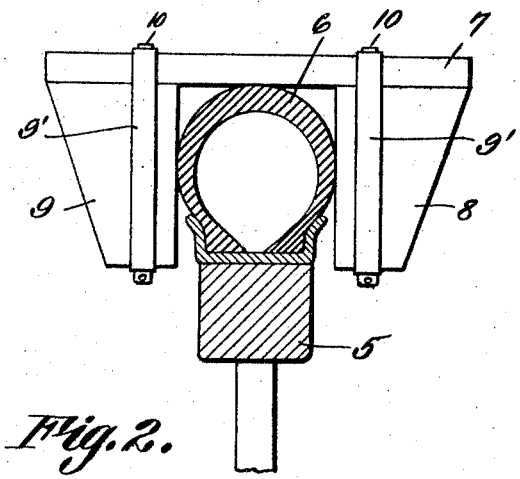

Figure 1 illustrates a view in elevation of a fragment of a wheel with a device embodying the invention applied thereto; and Fig. 2 illustrates a sectional view through the tire with the device in elevation.

In these drawings 5 denotes the usual rim and 6 a tire and as these parts may be of any ordinary construction and are included in the drawing for illustrative purposes only, they will not be described in detail.

The anti skidding device comprises a series of members each of which is composed of a traction plate 7 and side blocks 8 and 9, each of which is attached to the plate near an end thereof.

Each block is secured to the plate by a yoke or metal strap 9', which strap embraces the plate as well as the sides and end of the block. Each strap is held in place on the plate by a fastening 10 such as a bolt, the heads thereof adding to the tractional qualities of the device.

The anti-skidding members are held in place by chains which include the links 11 and the interposed plates 12, which latter have apertures 13 for the reception of a bolt 10 and each plate is held on a bolt by a nut 14, so that by the use of these chains on each side of the rim, the members may be held against displacement with respect to the tire.

Anti skidding devices of the character indicated may be made of wood, as stated, and will prove comparatively inexpensive and of pronounced durability, compared with their cost. Beside the antiskidding feature the devices will serve to support greater loads on roads which are without firm beds as the plates present relatively large bearing surfaces which will engage the road bed.

We claim—

1. In an anti skidding device for tires, anti skidding members, each comprising a plate, a block at each end of the plate, a yoke consisting of a strap of metal embracing the plate and one of the blocks, a bolt for connecting each strap to a plate and block, and means for holding the anti-skidding members on a tire.

2. In an anti skidding device for tires, anti-skidding members, each comprising a plate, a block at each end of the plate, a yoke consisting of a strap of metal embracing the plate and one of the blocks, a bolt for connecting each strap to a plate and block, and means for holding the anti-skidding members on a tire, said means comprising apertured plates applied to the bolts and intermediate links connecting the said plates.

WILLIAM G. WEATHERLY.
EDWARD M. WEATHERLY.

Copies of this patent may be obtained for five cents each, by addressing the "Commissioner of Patents, Washington, D. C."